United States Patent
Simari et al.

(10) Patent No.: US 10,282,614 B2
(45) Date of Patent: May 7, 2019

(54) REAL-TIME DETECTION OF OBJECT SCANABILITY

(71) Applicant: Microsoft Technology Licensing, LLC, Redmond, WA (US)

(72) Inventors: Matthew A. Simari, Seattle, WA (US); Vijay Baiyya, Redmond, WA (US); Lin Liang, Redmond, WA (US); Simon Stachniak, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 65 days.

(21) Appl. No.: 15/047,030

(22) Filed: Feb. 18, 2016

(65) Prior Publication Data

US 2017/0243064 A1    Aug. 24, 2017

(51) Int. Cl.
*G06K 9/00* (2006.01)
*G06T 7/00* (2017.01)
(Continued)

(52) U.S. Cl.
CPC ..... *G06K 9/00671* (2013.01); *G06K 9/00201* (2013.01); *G06K 9/3208* (2013.01); *G06K 9/6215* (2013.01); *G06K 9/6256* (2013.01); *G06K 9/6263* (2013.01); *G06N 99/005* (2013.01); *G06T 7/0002* (2013.01); *G06T 7/50* (2017.01); *G06K 2209/40* (2013.01); *G06T 2207/20081* (2013.01); *G06T 2207/20084* (2013.01); *G06T 2207/30168* (2013.01)

(58) Field of Classification Search
CPC ............. G06K 9/00671; G06K 9/3208; G06K 9/6256; G06K 9/6215; G06K 9/6263; G06N 99/005
See application file for complete search history.

(56) References Cited

U.S. PATENT DOCUMENTS 5,835,902 A * 11/1998 Jannarone .............. G06K 9/623
706/25
6,484,048 B1    11/2002 Hoshino et al.
(Continued)

FOREIGN PATENT DOCUMENTS

WO    2013086543 A2    6/2013
WO    2015173173 A1    11/2015

OTHER PUBLICATIONS

Apple wins patent for wireless head-mounted display using iPhone, Feb. 17, 2015 by: Tim Bradshaw, https://www.ft.com/content/6943ebceb6e211e4a33b00144feab7de?mhq5j=e3 (last accessed Jul. 9, 2017).*

(Continued)

*Primary Examiner* — Aaron W Carter
(74) *Attorney, Agent, or Firm* — Arent Fox LLP

(57) ABSTRACT

A system and method are disclosed for determining and alerting a user as to whether an object will successfully scan before the post-processing of the scan data. In embodiments, before post-processing of the scan data begins, the scan data is processed by a machine learning algorithm which is able to determine whether and/or how likely the scan data is to return an accurate scanned reproduction of the scanned object. The machine learning algorithm may also suggest new positions for the object in the environment where the scan is more likely to be successful.

18 Claims, 12 Drawing Sheets

(51) Int. Cl.
  *G06T 7/50* (2017.01)
  *G06K 9/32* (2006.01)
  *G06K 9/62* (2006.01)
  *G06N 99/00* (2019.01)

(56) References Cited

U.S. PATENT DOCUMENTS

| | | |
|---|---|---|
| 7,305,120 B2 | 12/2007 | Li |
| 8,189,965 B2 | 5/2012 | Edgar et al. |
| 8,355,183 B2 | 1/2013 | Wang |
| 8,462,355 B2 | 6/2013 | Vucinic et al. |
| 8,908,235 B2 | 12/2014 | Maeda |
| 8,941,894 B2 | 1/2015 | Tanaka |
| 2005/0145693 A1 | 7/2005 | Baitz et al. |
| 2005/0185828 A1* | 8/2005 | Semba ............... G06K 9/00006 382/124 |
| 2007/0236494 A1* | 10/2007 | Kriveshko ......... A61C 13/0004 345/419 |
| 2007/0297560 A1 | 12/2007 | Song et al. |
| 2013/0208091 A1 | 8/2013 | Yahav et al. |
| 2013/0287271 A1 | 10/2013 | Harper |
| 2013/0308838 A1 | 11/2013 | Westerman et al. |
| 2014/0225985 A1* | 8/2014 | Klusza ............... H04N 13/0207 348/43 |
| 2014/0270480 A1 | 9/2014 | Boardman et al. |
| 2015/0045928 A1* | 2/2015 | Perez .................... B29C 64/112 700/110 |
| 2015/0243035 A1* | 8/2015 | Narasimha ............. G06T 19/20 382/154 |
| 2016/0134803 A1* | 5/2016 | Deng ................. H04N 5/23222 348/222.1 |
| 2016/0299996 A1* | 10/2016 | Huang ..................... H04N 1/00 |
| 2017/0103510 A1* | 4/2017 | Wang .................... G06T 7/0002 |

OTHER PUBLICATIONS

Simske, et al., "User-Directed Analysis of Scanned Images", in Proceedings of the ACM symposium on Document engineering, Nov. 20, 2003, pp. 212-221.

Yuan, Jeremy Brand Yuan, "Evernote: Scannable_ A New Mobile Scanning App from Evernote", Published on: Jan. 8, 2015 Available at: https://blog.evernote.com/blog/2015/01/08/scannable-new-mobile-scanning-app-evernote/.

Kolev, et al., "Turning Mobile Phones into 3D Scanner", in Proceedings of the IEEE Conference on Computer Vision and Pattern Recognition, Jun. 23, 2014, pp. 3946-3953.

"International Search Report and Written Opinion Issued in PCT Application No. PCT/US2017/017088", dated May 23, 2017, 13 Pages.

* cited by examiner

Fig. 2
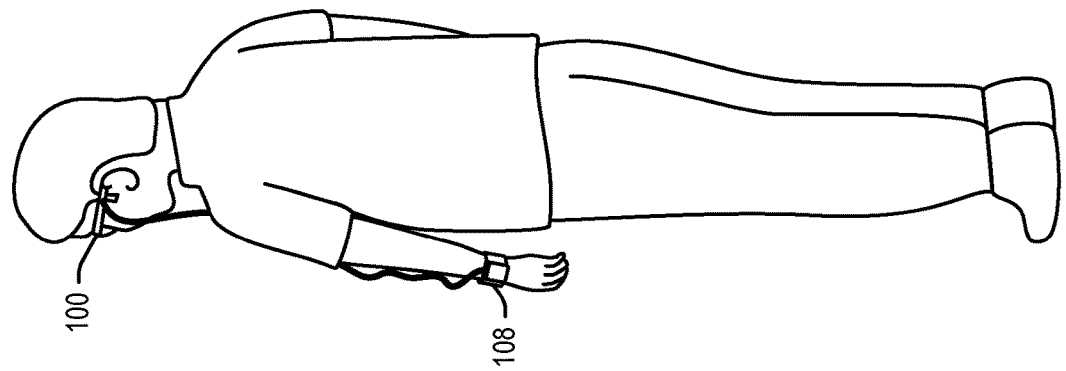
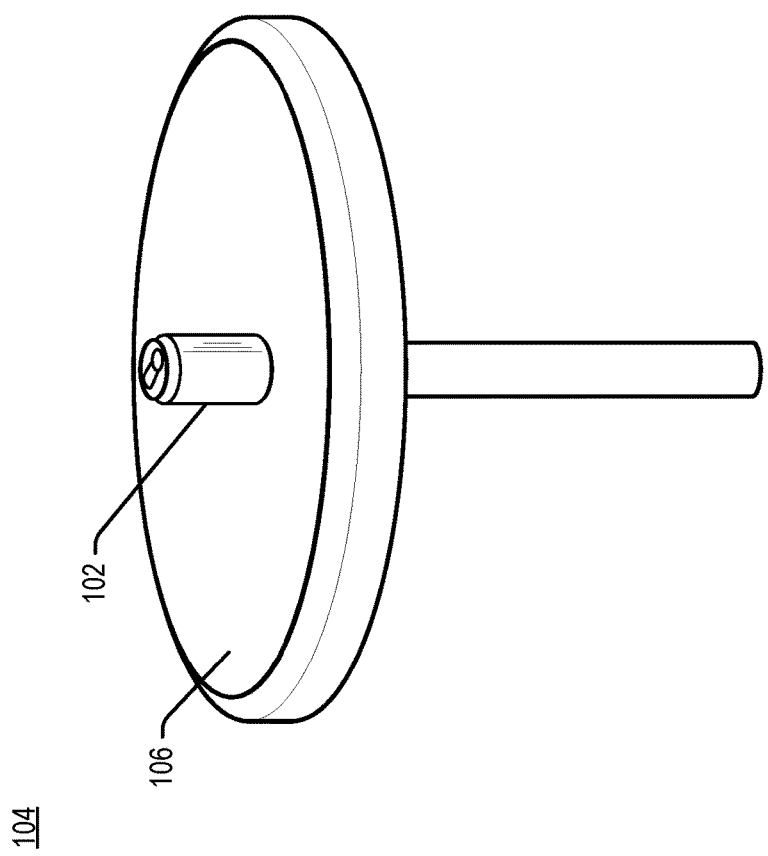

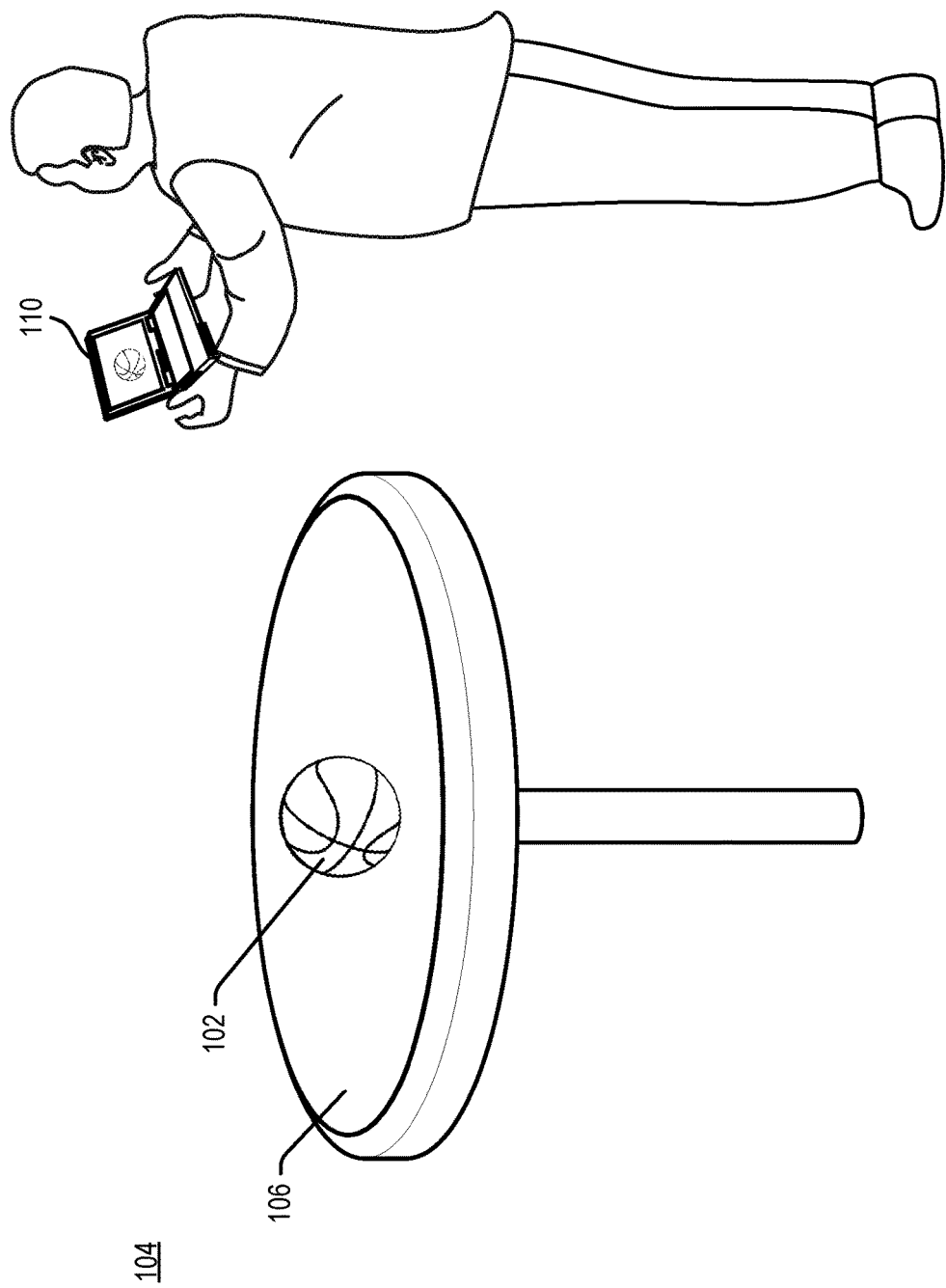

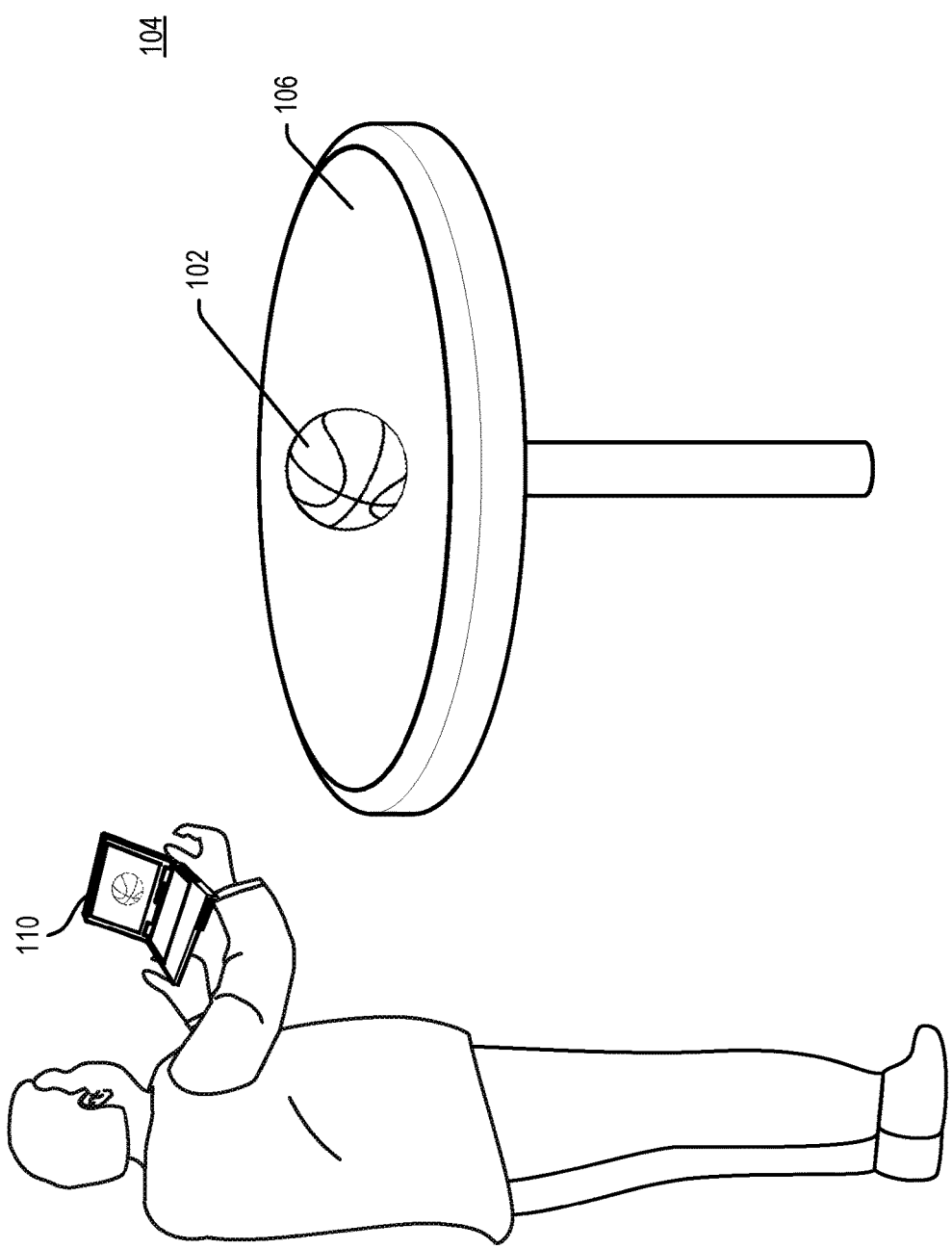

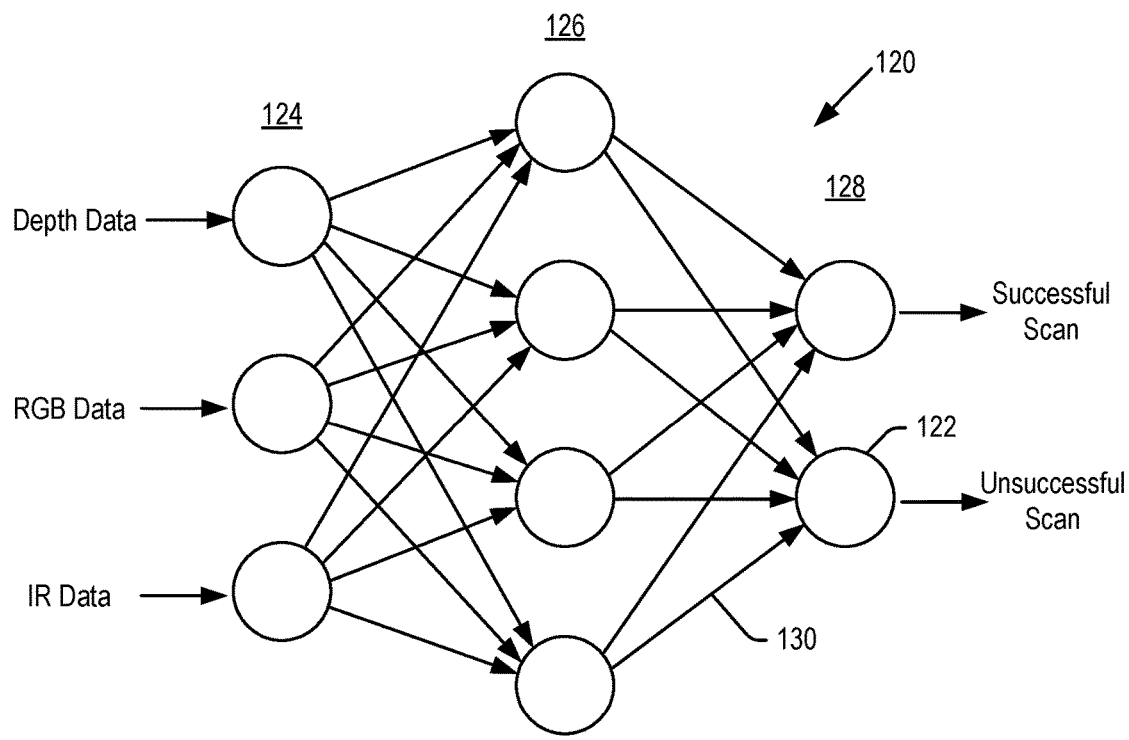
*Fig. 7*
*(Step 208)*
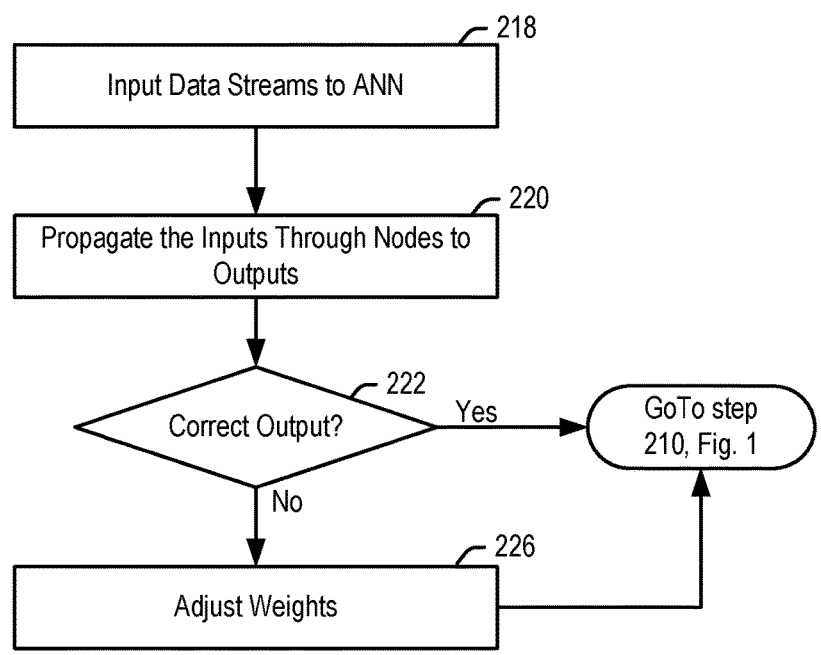

(Step 232)

REAL-TIME DETECTION OF OBJECT SCANABILITY

BACKGROUND

Three-dimensional (3D) scanning technologies use image capture devices to scan a real world object and reproduce the object either on a display or as a real world object replica using 3D printing techniques. A key obstacle to widespread adoption of object scanning is that there are still many objects that do not produce an accurate reproduction when scanned by current technologies. There are a variety of reasons why a particular object may not reproduce accurately when scanned, including for example specularity, reflectivity, surface textures, surface concavities, etc.

This problem is compounded by the fact that conventional scanners do not alert the user when a target object cannot be scanned. By not knowing whether an object is "scanable" or not, the user often invests a significant amount of time in a scanning process that will ultimately fail. Post-processing of scan data can take up to an hour or two to return the scanned replica, with the user not being made aware that it will not succeed until the post-processing step is completed.

SUMMARY

Embodiments of the present technology relate to methods of determining and alerting a user as to whether an object will successfully scan before the post-processing of the scan data. In embodiments, before post-processing of the scan data begins, the scan data is processed by a machine learning algorithm, referred to herein as a scanability algorithm, which is able to determine whether and/or how likely the scan data is to return an accurate scanned reproduction of the scanned object. The scanability algorithm may also suggest new positions for the object in the environment where the scan is more likely to be successful.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2 is a perspective view of a user scanning an object from a first perspective.

FIG. 4 is a perspective view of a user scanning an object from a first perspective.

FIG. 5 is a perspective view of a user scanning the object of FIG. 4 from a second perspective.

FIG. 6 is an illustration of a scanability model implemented in a machine learning neural network according to an embodiment of the present technology.

FIG. 7 is a flowchart providing further detail of step 208 for training the scanability model.

DETAILED DESCRIPTION

Embodiments of the present technology will now be described with reference to the figures, which in general relate to methods of determining in real time whether a given object will successfully scan in a given environment before the post-processing of the scanned data. In embodiments, before post-processing of the scanned data begins, the scanned data is processed by a machine learning scanability model, which is able to determine whether and/or how likely the scan data is to return an accurate scanned reproduction of the scanned object.

In embodiments, the scanability model is developed from a machine learning algorithm which may be trained to recognize scan data that is likely to result in a successful scan versus an unsuccessful scan. A large number of learning trials may be performed where objects are scanned by one or more image sensors, and the scan data stream(s) are input into the machine learning algorithm. The output of the machine learning algorithm in a given trial is compared against the actual output from post-processing of the scan data, and from this, the machine learning algorithm may be updated or refined based on any deviation from the respective outputs.

In general, the scanability algorithm may develop the model to increase the accuracy of its predictions by performing a large number of learning trials over which the scanability model is trained to make accurate predictions. In embodiments, there may be between one thousand and one hundred thousand learning trials for the scanability model, but the number of learning trials may be less than one thousand and greater than one hundred thousand in further embodiments. Thereafter, the scanability algorithm may be used by end-users in performing scans. Using the refined scanability model, the scanability algorithm may inform a user of the likely outcome of an object scan before post-processing of the scan data.

In embodiments, in addition to notifying a user that a scan will likely be unsuccessful, the scanability algorithm may also suggest new positions for the object in the environment where the scan is more likely to be successful. In embodiments, new example data can be composited out of the existing captures generated by the scanability algorithm to generate a suggestion of an alternate position. For example, during the scan of the object, a volume may be defined where the scan takes place. This volume, shown for example in the depth data, can then be synthetically re-injected onto other surfaces to try and determine if it might scan better in other parts of the environment.

Additionally, as explained below, the scanability model built by the scanability algorithm may continue to learn and be updated based on feedback on the accuracy of the model when in use by end-users predicting actual instances of a successful or unsuccessful scan.

Figure 1:
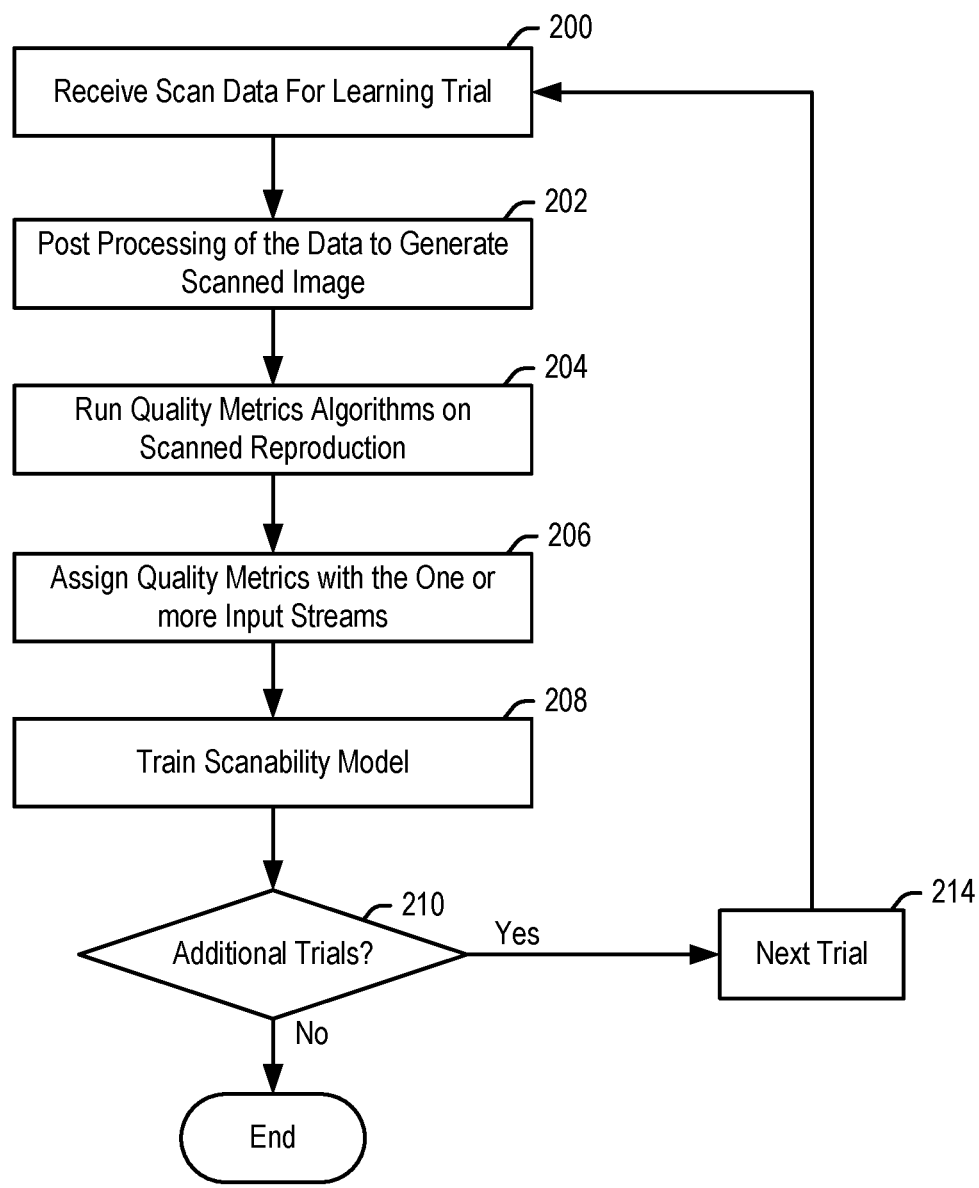
FIG. 1 is a flowchart illustrating a learning mode of a scanability algorithm according to embodiments of the present technology.

The flowchart of FIG. 1 shows an embodiment of how the machine learning scanability algorithm of the present technology may generate the scanability model. In step 200, the scanability algorithm receives the scan data from a first learning trial. The scan data may comprise data streams generated by one or more image sensors capturing images of an object and surrounding environment from different perspectives. In embodiments, the image sensor may include a depth camera generating a depth data stream, an RGB camera generating an RGB data stream and/or an infrared (IR) camera generating an IR data stream. In any given trial, the scan data may be comprised of image data from one or more of these data streams. Other image sensors may also or alternatively be used. As explained below, pose data may be used as an indicator of whether the scan will be successful or unsuccessful.

In embodiments described below, the scan data is 3D scan data generated from one or more image sensors of a head mounted display device for presenting an augmented reality experience. Details of the operation of the image sensors of a head mounted display device are peripheral to the present technology, beyond the fact that they are able to capture images of an object from different perspectives using for example a depth camera, an RGB camera and/or an IR camera. However, a description of a head mounted display device and its image sensors is provided for example in U.S. Patent Publication No. 2013/0326364 entitled "Position Relative Hologram Interactions," published on Dec. 5, 2013.

It is understood that the present technology is not limited to head mounted display devices or to receiving scan data from particular image sensors. The present technology may receive scan data from a wide variety of scanning devices using a wide variety of different image sensors. It may happen that a scanning device employs each of a depth camera, RGB camera and an IR sensor, in which case each of these data streams may be provided to the scanability algorithm for analysis.

However, it may also be that a scanning device employs less than all three of these image sensors. It is a feature of the present technology that the scanability algorithm and refined model can operate with data streams from one or more image sensors, without having information on which image sensors are providing the data streams. In particular, as explained below, data streams that are received are input to an artificial neural network machine learning algorithm. The algorithm performs learning trials where one or more data streams, for example comprised of depth data, RGB data, IR data and/or pose data, are received. The algorithm gets trained to identify whether the one or more input data streams, in a given instance, will likely result in a successful scan or an unsuccessful scan.

Figure 3:
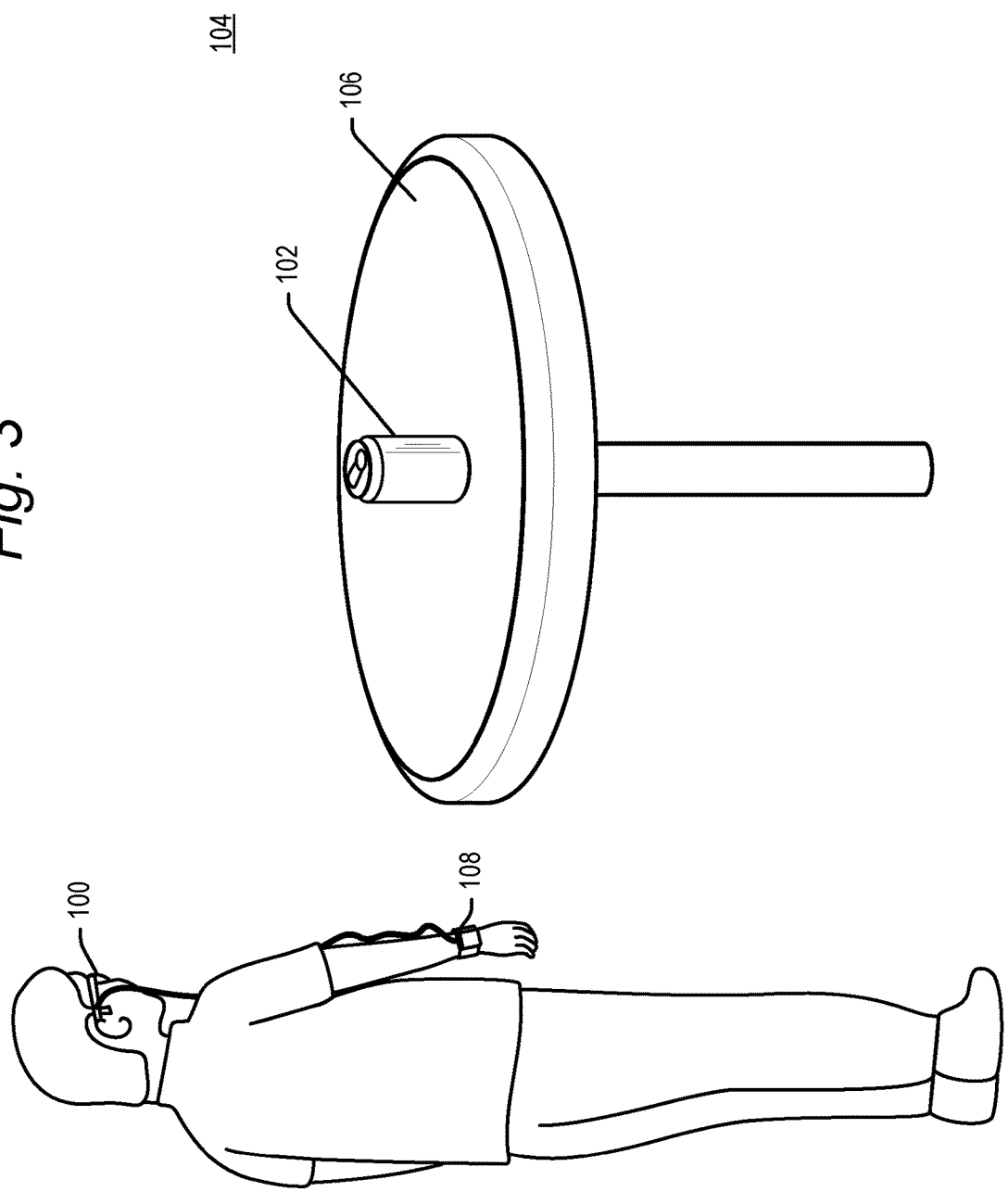
FIG. 3 is a perspective view of a user scanning the object of FIG. 2 from a second perspective.

The data streams received in step 200 are based on a scanning device capturing a real world 3D object from a variety of different perspectives. For example, FIGS. 2 and 3 illustrate examples of a user wearing a head mounted display device 100 for scanning an object 102 from different perspectives within an environment 104 having a surface 106 on which the object 102 is situated. In embodiments, the environment 104 scanned may be an area directly appurtenant to the object. Thus, in FIGS. 2 and 3 the environment 104 may consist entirely of the surface 106.

The head mounted display device 100 may include one or more image sensors including for example a depth sensor, RGB camera and/or an IR sensor, which capture image data from the object 102 and environment 104. The scan data may then be processed by the scanability algorithm executing within a processing unit 108 associated with the head mounted display device 100. In alternative embodiments, it is also possible to upload the scan data to one or more remote servers in the cloud and then run the scannability algorithm in the cloud. This may be useful for example when the scanning device does not have enough computing power or special computing hardware to run the algorithm efficiently. FIGS. 2 and 3 show the user capturing the object 102 from two different perspectives, but it is understood that the user may move around the object and capture the object from several more perspectives.

FIGS. 4 and 5 illustrate a user capturing scan data of an object 102 within an environment using a hand-held computing device 110 including one or more image sensors including, for example a depth sensor, RGB camera and/or an IR sensor. The scanned data may then be processed within a processing unit within or associated with the computing device 110 and executing the scanability algorithm. The computing device 110 may for example be a laptop, tablet, smart phone or an image scanner associated with a scanning device. Again, FIGS. 4 and 5 show the user capturing the object 102 from two different perspectives, but it is understood that the user may move around the object and capture the object from several more perspectives.

The object 102 may have been imaged from a sufficient number of different perspectives such that image data from all visible surfaces of the object is received. In this instance, the learning algorithm will determine whether all visible surfaces of the object may be successfully recreated in the scan, as explained below. However, it is understood that where a scanning device has scanned a 3D object from only limited perspectives, for example a front half of an object, the learning algorithm will determine whether the front half of the object (or whatever views are available from the scanned perspectives) may be successfully recreated in the scan.

Depending on the scanning device and image sensor(s) used in a scan, the scan data will include a wide variety of information relating to the attributes of both the captured object and the environment in which the object is captured. For example, the scan data may include data relating to the following attributes of the object:
  specularity, or specular reflection—light, reflecting in parallel rays off of smooth surfaces of the scanned object, which is received in the image sensor may make it difficult to determine the nature of the surfaces;
  diffuse reflections—light, reflecting diffusely off of rough surfaces of the scanned object, which is received in the sensor may make it difficult to determine the nature of the surfaces;
  transparency—light, passing through surfaces of the scanned object, may make it difficult to determine the nature of the surfaces;
  texture—topological characteristics of the object, relating to the uniformity, roughness, waviness, etc. of surfaces of the scanned object, may make it easier or harder to determine the nature of the scanned surfaces;
  concavities—surfaces which include concavities may be difficult to scan accurately;
  symmetry—objects which are symmetrical about one or more planes may be more difficult to scan accurately;
  localized cues—objects which do not have localized cues, such as distinct lines, points or other discontinuities, may be more difficult to scan accurately.
The above is not intended as a comprehensive listing of the attributes which particular image sensors may capture, and it is understood that a variety of other attributes may be gleaned from the scanned data of the object in addition to or instead of those listed above.

Each of the above attributes may affect whether an object may be successfully scanned. However, as explained below, embodiments of the scanability algorithm are able to develop a model which accounts for these object attributes without having to individually quantify or classify these attributes within the scan data.

In addition to the attributes of the object, the image sensor(s) may capture data relating to the environment in which and on which the object is situated. The environment, including a surface on which the object is situated, may have the same types of attributes described for the object above. An additional environmental attribute may be luminance; i.e., the amount of natural or man-made light in the environment. Too much luminance may result in high specular or diffuse reflection off of the object or surface on which the object is situated, and make it difficult to accurately scan the object. Conversely, too little luminance may make it difficult accurately detect surfaces of the object. Again, as explained below, embodiments of the scanability algorithm are able to develop a model which accounts for these environmental attributes without having to individually quantify or classify these attributes within the scan data.

Once the one or more scan data streams have been received in step 200, post-processing of the scan data may be performed in step 202. Post-processing of the scanned data refers to the processing of the image data to generate the scanned reproduction of the object. As noted in the background section, the post-processing step may be time consuming. However, during the learning trials, post-processing is performed to determine whether a given set of one or more data streams does or does not in fact result in a successful scan of the object.

In step 204, one or more quality metrics algorithms are run to determine whether the scan was successful or how successful the scan was. The quality metrics algorithm(s) may measure different characteristics of the scanned reproduction, and produce a quantitative or qualitative output by which to justify the success or failure of the scanned reproduction in a given trial. The quality metric may be a pass/fail rating or a sliding scale numeric value, with for example a low number representing an accurate and successful reproduction and a high number representing an inaccurate failed reproduction. In embodiments, quality metrics algorithm(s) may be programmed to value certain reproduced characteristics in the scanned reproduction over other reproduced characteristics. Which reproduced characteristics are emphasized over others in the quality metrics algorithm(s) may vary in different embodiments, depending at least in part on what characteristics the administrators of the quality metrics algorithms consider to be important.

In step 206, the quality metric(s) determined by the one or more quality metrics algorithm is/are assigned as ground truth, or an "objective output" for the one or more input data streams in each learning trial to train the machine learning algorithm as explained below.

In step 208, the one or more input data streams and the objective output are used to train the scanability algorithm and develop the finished scanability model. Further details of step 208 are explained now with reference to the diagram of FIG. 6 and the flowchart of FIG. 7.

In general, the scanability algorithm employs an artificial neural network (ANN) 120, a symbolic illustration of which is shown in FIG. 6. ANN 120 is comprised of a number of neurons, or nodes, 122 (one of which is numbered) which exchange information with each other as indicated by the arrow connectors 130 (one of which is numbered). The nodes 122 may be organized in layers, including an input layer 124, a hidden layer 126 and an output layer 128. In embodiments, the scanability algorithm may employ many more layers in ANN 120 than are shown in FIG. 6. Each connector 130 may be assigned a numeric weight. Over the learning trials, the numeric weights associated with each connector may be refined as explained below until the ANN 120 is developed into a scanability model which can accurately predict an outcome of a satisfactory scan or unsatisfactory scan for a given set of one or more scan input data streams.

Referring now to the flowchart of FIG. 7, the one or more input data streams are input to the input layer 124 of the ANN 120 in step 218. For example, FIG. 6 shows a depth data input stream, an RGB data input stream and an IR data input stream. However, as noted above, there may be less than the three data streams provided to the input layer 124 and there may be additional and/or alternative types of data stream that are supplied to the input layer 124 in further embodiments. As one further example, pose data may also be used as an input data stream to the input layer 124 of the ANN 120. In particular, where pose data is jittery or moving at high speeds, this may be used as an input tending to show a poor result.

In step 220, the one or more input data streams may propagate across the nodes 122 and layers to the nodes 122 of the output layer. The input to each node 122 may be processed as is known for conventional artificial neural networks and the output of each node is passed along a connector 130 to the next layer, multiplied by the numerical weight of the connector. The first time through ANN 120, the numeric weights may be randomly or arbitrarily selected, as they will be adjusted over the learning trials. The result of the forward propagation of the one or more input data streams will be a calculated output of either a successful scan or an unsuccessful scan.

In step 222, the scanability algorithm checks whether the outcome is correct. That is, it compares the calculated output for a given set of one or more data streams against the objective output determined through post-processing of the one or more data streams in step 204 as described above. The objective output of the post-processing step may be provided to the scanability algorithm for use in step 222 by an administrator via a user interface associated with the computing device executing the scanability algorithm.

Where the calculated outcome matches the objective outcome in step 222 for a given trial, the scanability algorithm determined the correct outcome, and the algorithm may proceed to the next learning trial. On the other hand, where the calculated outcome does not match the object outcome in step 222 for a given trial, the scanability algorithm determined an incorrect result. In this event, the numeric weights of one or more of the connectors may be adjusted in a known manner in step 226, using for example a back-propagation method. Other known methods of adjusting the weights of the connectors may be used in further embodiments. The algorithm may then proceed to the next learning trial.

Referring again to FIG. 1, once the scanability model has been trained with the data for a given trial, the algorithm checks in step 210 whether there are additional trials. In embodiments, this may be a predetermined number of trials. In further embodiments, the learning trials may continue until the weights of the ANN 120 have been refined to the point where the ANN 120 is returning a correct prediction of a successful or unsuccessful scan above in some predetermined percentage of the trials. This percentage may for example be between 95% and 100%, though it may include lower percentages in further embodiments.

Figure 8:
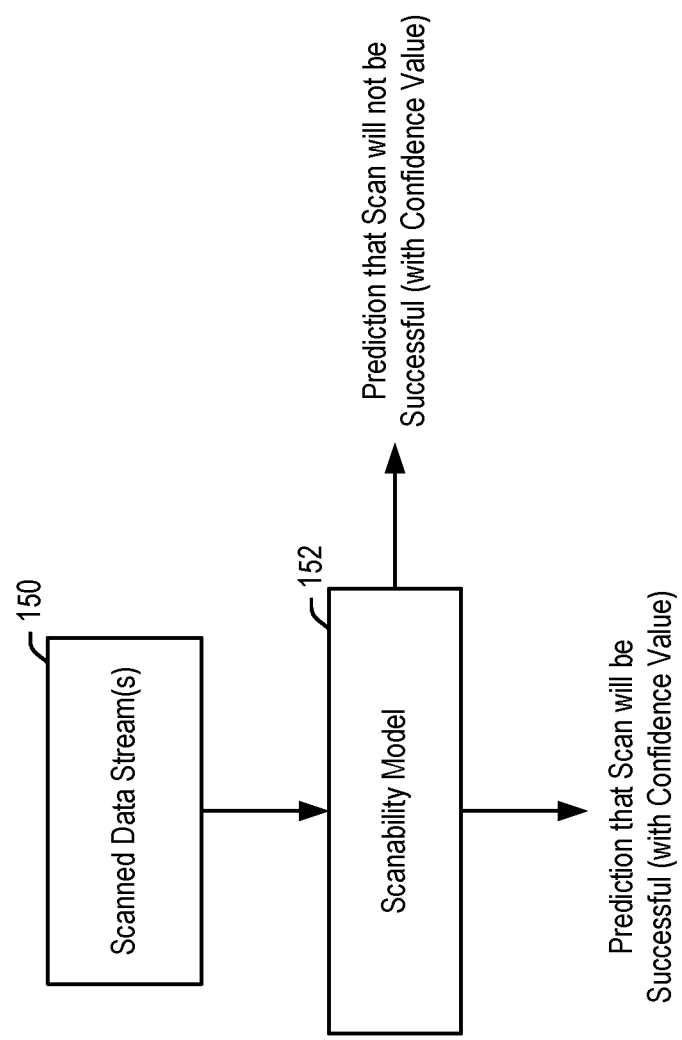
FIG. 8 is a block diagram of the operation of the scanability model of the present technology to predict the success or failure of a scanned device.

Upon completion of the learning trials and tuning of the weights of the ANN 120, the ANN 120 with the refined weights may be published as a scanability model 152 (FIG. 8) for use by end users in predicting the outcome of a scan of an object. An example of an implementation of the scanability model 152, as used by an end-user performing a scan, will now be explained with reference to the flowchart of FIG. 9.

Figure 10:
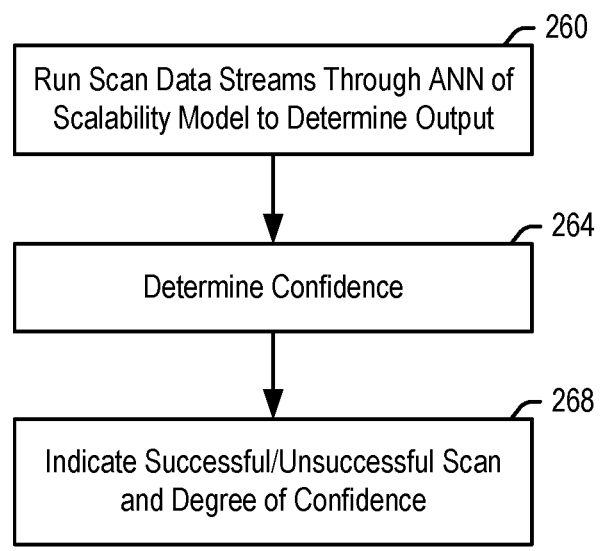
FIG. 10 is a flowchart showing additional detail of step 232 from FIG. 9.

Once the user scans an object, using for example any of the above-described scanning devices, the scanability model 152 may receive the scan data 150 in a step 230. In step 232, using the scanability model 152, the algorithm may determine whether an accurate (successful) scan will result from the scan data. Further details of step 232 will now be described with reference to the flowchart of FIG. 10.

In step 260, the one or more data streams in the scan data may be provided to the input layer of the ANN 120 of the scanability model 152. The ANN 120 of model 152 operates as described above to predict an outcome. However, as the values of the weights are now presumably refined, the back-propagation tuning step of the weights is omitted.

In embodiments, the forward propagation of the input data streams through the layers of the scanability model may strongly point to either a success or failure of the scan. The strength to which the calculated output of the scanability model points to one or the other of successful scan/failed scan may be quantified into a confidence value in step 264. In step 268, the scanability model 152 may return a prediction of a successful or unsuccessful scan from the calculated output, together with a confidence value representing a confidence in the calculated output. Calculation of the confidence value in step 264 may be skipped in further embodiments.

Figure 9:
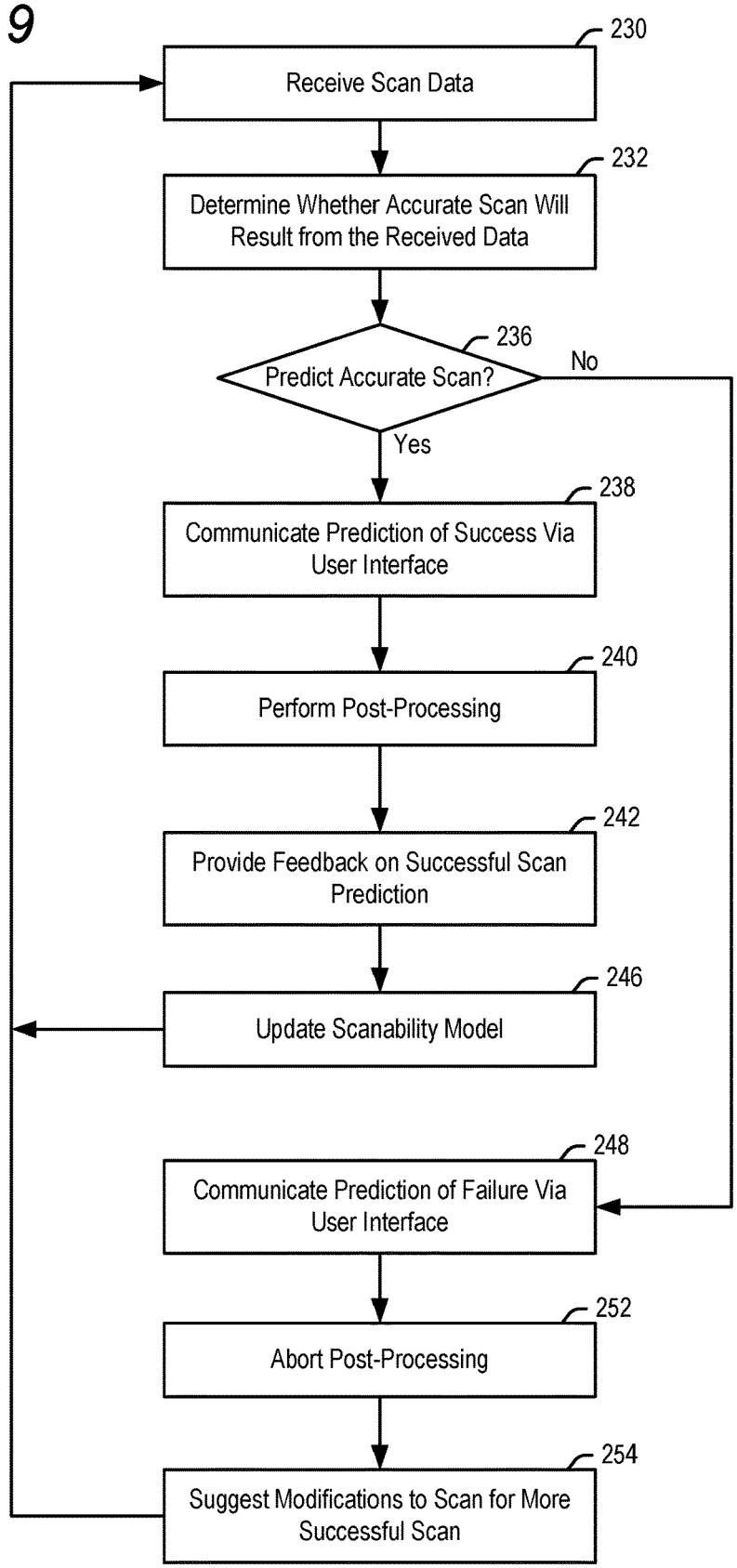
FIG. 9 is a flowchart of the operation of the present technology in use to predict the success or failure of a scanned object.

Returning to the flowchart FIG. 9, in step 236, if the scanability model predicts a successful scan, the prediction may be communicated to the user in step 238 and post-processing may be performed on the scan data in step 240.

Figure 11:
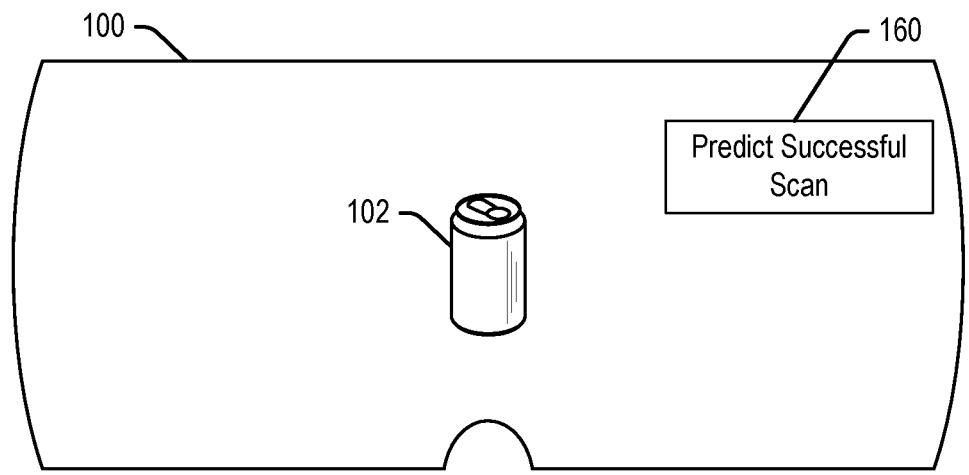
FIGS. 11-14 are illustrations of a head mounted display including a pop-up menu with a prediction as to whether the scan will be successful or unsuccessful.
Figure 12:
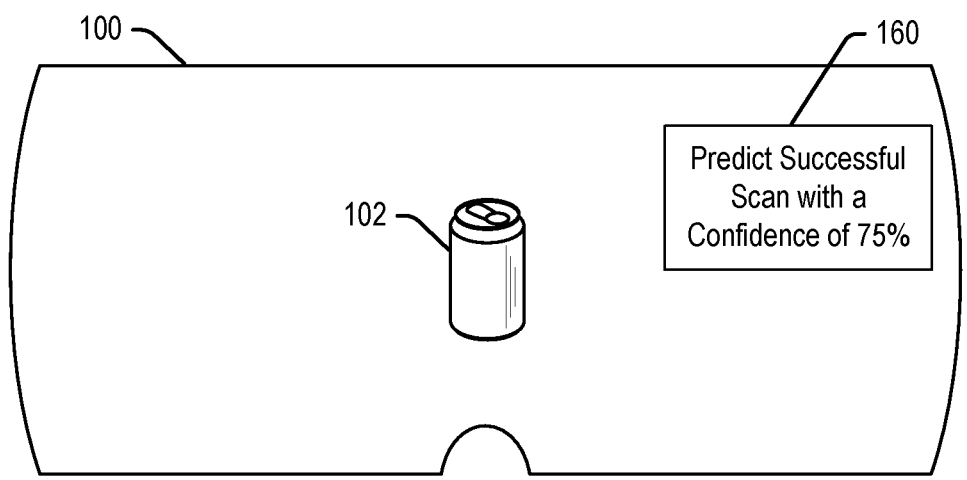

FIGS. 11 and 12 show the head mounted display 100 including the object 102 to be scanned. A prediction of a successful scan may be communicated to the user for example by a pop-up display window 160 appearing in the user's field of view. In FIG. 11, the prediction is communicated, and in FIG. 12, the prediction and confidence of the prediction is communicated. The prediction and/or confidence may be communicated to the user a variety of other ways, including with audio, in further embodiments.

Post-processing of the scan data into a reproduction of the scanned object may be performed by any of a variety of post-processing algorithms. As indicated above, the present technology does not relate to the efficacy of the post-processing algorithm. The scanability model of the present technology may be included as part of the post-processing algorithm, or vice versa. The scanability model may be separate from the post-processing algorithm in further embodiments.

At a completion of the scan, a user may have the ability to provide feedback as to the accuracy of the prediction in step 242. For example, if an accurate scan was predicted, but in fact the resulting scan was not accurate, a user may provide feedback via a user interface, which feedback may be used to update and further train the numerical weights in the scanability model in step 246.

Figure 13:
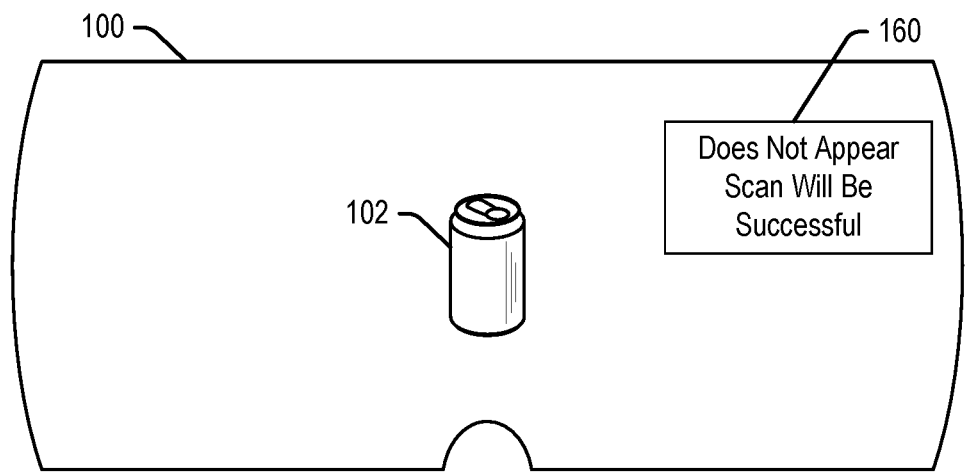
Figure 14:
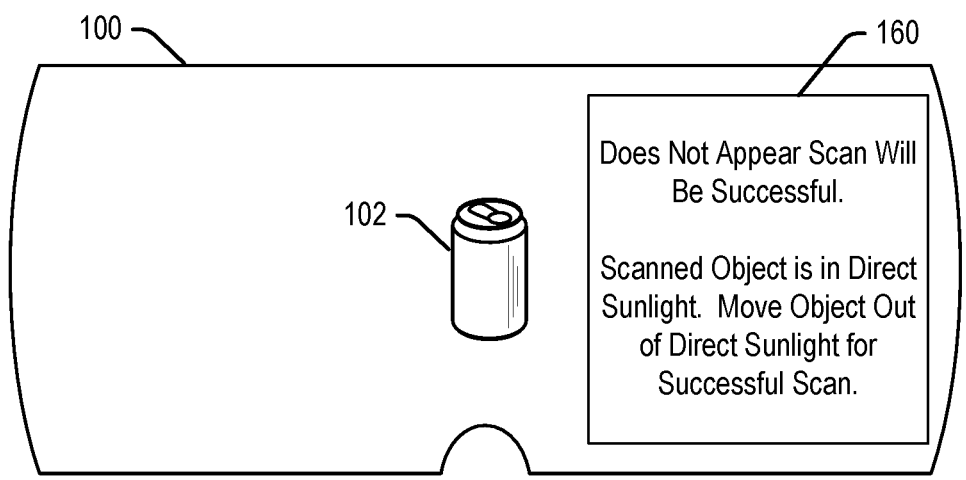

On the other hand, if the scanability model predicts a failed scan in step 236, the model may communicate this prediction to a user in step 248 and as shown in FIGS. 13 and 14. Where post-processing of scan data to generate a reproduction of the scanned object may take a long time, for example on the order of 1 to 2 hours, the prediction as to a successful or failed scan in accordance with aspects of the present technology may be determined in real time; that is, nearly instantaneously by a processor executing the scanability model in for example a few milliseconds. Thus, the prediction as to whether the scan of an object will be successful or unsuccessful may be provided before the post-processing of the scan data begins. In further embodiments, the prediction as to whether the scan of an object will be successful or unsuccessful may be provided just after the post-processing of the scan data begins and long before the post-processing is completed.

Upon receiving the prediction of a failed scan in steps 236 and 248, a user may abort post-processing of the scan data in step 252, and thereby save a significant amount of otherwise wasted time. Of course, upon receiving the prediction of a failed scan, the user may elect to proceed with the scan anyway, and step 252 may be skipped.

In accordance with further aspects of the present technology, upon receiving an indication of a failed scan, scanability model may suggest to the user in step 254 ways in which the scan may be modified that will result in a successful scan. For example, if too much light within a portion of the environment may make scanning difficult. As a further example, where the attributes of the object (reflectivity, transparency, etc.) are too similar to the attributes of the surface on which the object is supported, this may make scanning of the object difficult.

In accordance with this embodiment, the scanability model 152 may detect these attributes in the one or more of the input data streams (independent of the ANN 120). Thus, where for example the model detects a high degree of luminance, such as for example where the object is in direct sunlight, the model may suggest to the user that the object removed to an area of the environment with less luminance. As a further example, where the attributes of the object and a surface on which the object is located are too similar, the model may suggest that the user move the object to a different surface. Other examples are contemplated.

FIGS. 13 and 14 show the head mounted display 100 including the object 102 to be scanned. A prediction of an unsuccessful scan may be communicated to the user for example by a pop-up display window 160 appearing in the user's field of view. In FIG. 13, the prediction is communicated, and in FIG. 14, the prediction is communicated together with a suggestion of how to reposition the object to result in better scan. The prediction and/or suggestion may be communicated to the user a variety of other ways, including with audio, in further embodiments.

Figure 15:
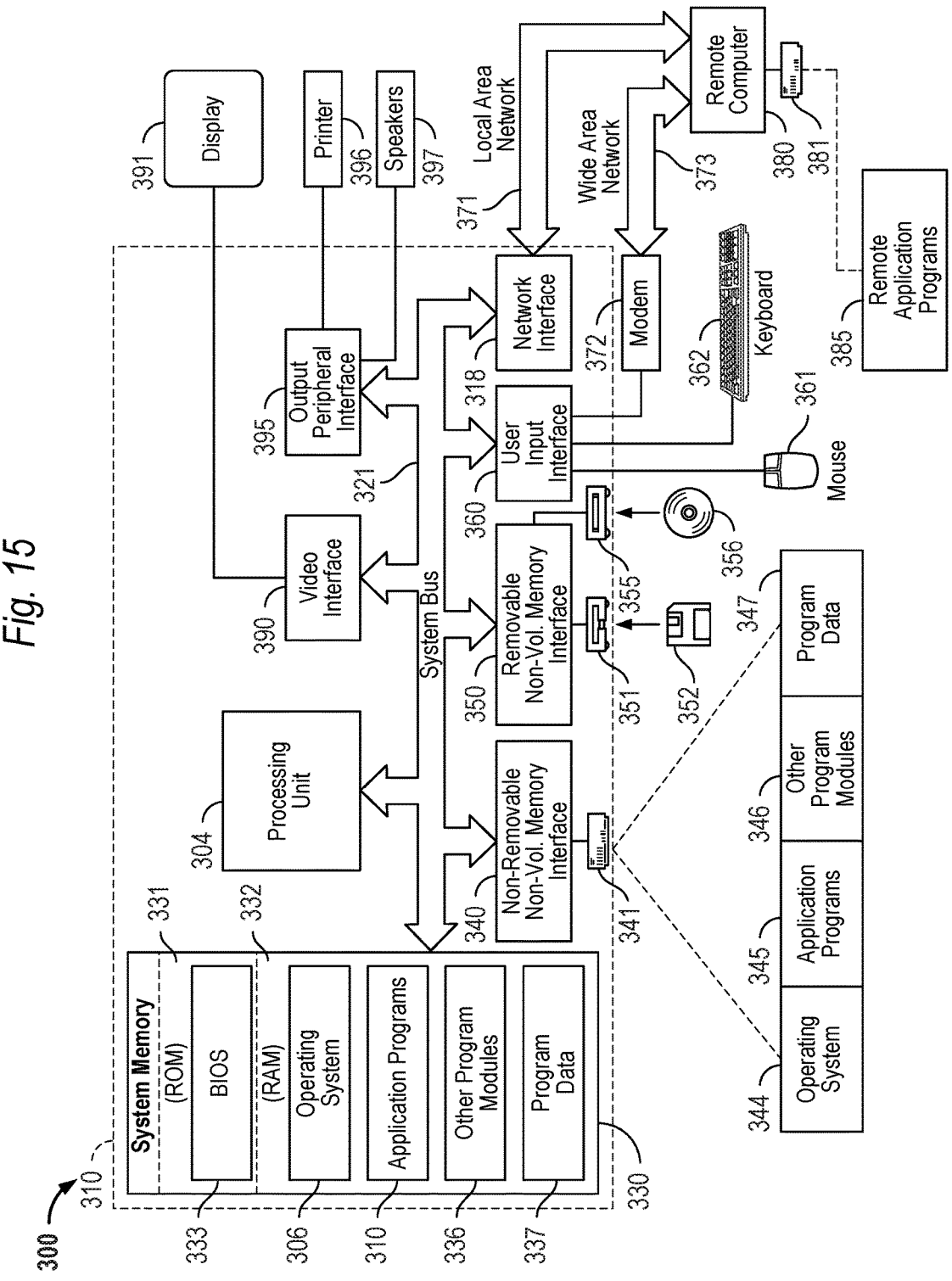
FIG. 15 is a block diagram of an illustrative computing system for implementing aspects of the present technology.

FIG. 15 described below sets forth a computing device including a processor for executing the scanability algorithm and memory for storing the scanability model. In one embodiment, during the learning trials in the development and training of the scanability model, the scanability algorithm may run on one or more servers under the control of an entity administering the scanability algorithm. Once the learning trials have been completed, the scanability algorithm and scanability model may be distributed to client computing devices, including a head mounted display device or other computing device, to receive predictions when scanning an object. In such an embodiment, when feedback on a successful scan prediction is provided (step 242, FIG. 9), that feedback to be uploaded from the client device to a central server. The central server may in turn update the scanability model and then distribute the updated scanability model to client devices using the scanability algorithm.

In a further embodiment, the scanability algorithm may be implemented without the learning trials being performed on the one or more servers under the control of the administering entity. In such an embodiment, the learning trials may in effect be crowd sourced to individual users on their respective client devices. Each such use may result in a prediction, and the users may provide feedback on those predictions. That feedback may be uploaded from the client devices to a central server. The central server may in turn update the scanability model and then distribute the updated scanability model to the respective client devices for continued use, training and development of the scanability model.

FIG. 15 illustrates a computing system 300 for executing the scanability algorithm and for storing the scanability model described above. The computing system 300 is one example of a suitable computing environment and is not intended to suggest any limitation as to the scope of use or functionality of the present system. Neither should the computing system 300 be interpreted as having any dependency or requirement relating to any one or combination of components illustrated in the exemplary computing system 300.

The present system is operational with numerous other general purpose or special purpose computing systems, environments or configurations. Examples of well-known computing systems, environments and/or configurations that may be suitable for use with the present system include, but are not limited to, personal computers, server computers, multiprocessor systems, microprocessor-based systems, network PCs, minicomputers, hand-held computing devices, mainframe computers, and other distributed computing environments that include any of the above systems or devices, and the like. In the distributed and parallel processing cluster of computing systems used to implement the present system, tasks are performed by remote processing devices that are linked through a communication network. In such a distributed computing environment, program modules may be located in both local and remote computer storage media including memory storage devices.

With reference to FIG. 15, an exemplary computing system 300 for use in performing the above-described methods includes a general purpose computing device. Components of computing system 300 may include, but are not limited to, a processing unit 304, a system memory 316, and a system bus 321 that couples various system components including the system memory to the processing unit 304. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The system memory 316 includes computer storage media in the form of volatile and/or nonvolatile memory such as read only memory (ROM) 331 and random access memory (RAM) 332. A basic input/output system (BIOS) 333, containing the basic routines that help to transfer information between elements within computing system 300, such as during start-up, is typically stored in ROM 331. RAM 332 typically contains data and/or program modules that are immediately accessible to and/or presently being operated on by processing unit 304. By way of example, and not limitation, FIG. 15 illustrates operating system 306, application programs 310, other program modules 336, and program data 337.

The computing system 300 may also include other removable/non-removable, volatile/nonvolatile computer storage media. By way of example only, FIG. 15 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD-ROM or other optical media. Other removable/non-removable, volatile/nonvolatile computer storage media that can be used in the exemplary operating environment include, but are not limited to, magnetic tape cassettes, flash memory cards, DVDs, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350. In the context of this document, a computer readable storage medium may be any tangible medium that can contain, or store a program for use by or in connection with an instruction execution system, apparatus, or device. A computer readable storage medium does not include transitory, modulated or other types of signals.

The drives and their associated computer storage media discussed above and illustrated in FIG. 15 provide storage of computer readable instructions, data structures, program modules and other data for the computing system 300. In FIG. 15, for example, hard disk drive 341 is illustrated as storing operating system 344, application programs 345, other program modules 346, and program data 347. These components can either be the same as or different from operating system 306, application programs 310, other program modules 336, and program data 337. Operating system 344, application programs 345, other program modules 346, and program data 347 are given different numbers here to illustrate that, at a minimum, they are different copies.

A user may enter commands and information into the computing system 300 through input devices such as a keyboard 362 and pointing device 361, commonly referred to as a mouse, trackball or touch pad. Other input devices (not shown) may be included. These and other input devices are often connected to the processing unit 304 through a user input interface 360 that is coupled to the system bus 321, but may be connected by other interface and bus structures, such as a parallel port, game port or a universal serial bus (USB). A monitor 391 or other type of display device is also connected to the system bus 321 via an interface, such as a video interface 390. In addition to the monitor 391, computers may also include other peripheral output devices such as speakers 397 and printer 396, which may be connected through an output peripheral interface 395.

As indicated above, the computing system 300 may operate in a networked environment using logical connections to one or more remote computers in the cluster, such as a remote computer 380. The remote computer 380 may be a personal computer, a server, a router, a network PC, a peer device or other common network node, and typically includes many or all of the elements described above relative to the computing system 300, although only a memory storage device 381 has been illustrated in FIG. 15.

The logical connections depicted in FIG. 15 include a local area network (LAN) 371 and a wide area network (WAN) 373, but may also include other networks. Such networking environments are commonplace in offices, enterprise-wide computer networks, intranets and the Internet.

When used in a LAN networking environment, the computing system 300 is connected to the LAN 371 through a network interface or adapter 318. When used in a WAN networking environment, the computing system 300 typically includes a modem 372 or other means for establishing communication over the WAN 373, such as the Internet. The modem 372, which may be internal or external, may be connected to the system bus 321 via the user input interface 360, or other appropriate mechanism. In a networked environment, program modules depicted relative to the computing system 300, or portions thereof, may be stored in the remote memory storage device. By way of example, and not limitation, FIG. 15 illustrates remote application programs 385 as residing on memory device 381. It will be appreciated that the network connections shown are exemplary and other means of establishing a communications link between the computers may be used.

In summary, embodiments of the present technology relate to a method, comprising: (a) receiving scan data from a plurality of scans of one or more objects in a plurality of trials; (b) one of determining or receiving objective outputs in the plurality of trials as to whether the scan data results in a successful or failed scan of the one or more objects in the plurality of trials; (c) processing the scan data in the plurality of trials using an algorithm to determine calculated outputs in the plurality of trials as to whether the scan data results in a successful or failed scan of the one or more objects in the plurality of trials; and (d) refining the algorithm over the plurality of trials to improve a correspondence between the calculated output and the objective output where the calculated output differs from the objective output for the same scan data, the algorithm operable to predict a success or failure of scans of objects performed upon completion of the plurality of trials In further embodiments, the present technology relates to a computing device, comprising: one or more scanners comprising one or more image sensors operable to scan image data from a plurality of objects in a number of trials; and a processor operable to: receive, in each of the number of trials, scan data from the one or more image sensors, and generate a model, trained using the scan data from the one or more image sensors in the number of trials, enabling real time predictions of a success or failure for scan of an object performed upon completion of the number of trials.

In other embodiments, the present technology relates to a computer readable medium for storing computer instructions for providing feedback on whether a scan of an object will be successful, with the computer instructions executed by one or more processors to perform the steps of: (a) receiving scan data from the object, the scan data comprising one or more data streams; and (b) predicting whether the scan of the object will be successful or unsuccessful based on the one or more data streams of the scan data, said step of predicting occurring before post-processing of the scan data to obtain a reproduction of the scanned object is completed.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. A method, comprising:
   receiving scan data from scans of an object in a plurality of trials;
   post-processing the scan data to generate a scanned reproduction of the object based on the scan data;
   determining, using the scanned reproduction of the object, objective outputs in the plurality of trials as to whether the post-processing of the scan data can return an accurate scanned reproduction of the object in the plurality of trials;
   training a machine learning algorithm over the plurality of trials to improve a correspondence between the objective outputs and a calculated output of the machine learning algorithm for the scan data, the machine learning algorithm operable to predict, upon completion of a new scan of a new object and prior to post-processing new scan data produced by the new scan, whether the new scan data can return an accurate scanned reproduction of the new object;
   applying the machine learning algorithm to the new scan of the new object to determine whether the new scan of the new object can return the accurate scanned reproduction of the new object; and
   suggesting an alternative position for the new object based, at least in part, on scan environment attributes included in the new scan data, in response to determining, prior to the post-processing of the new scan data, that the new scan is unlikely to return the accurate scanned reproduction of the new object.

2. The method of claim 1, further comprising:
   receiving feedback on an output of the applying of the machine learning algorithm to the new scan of the new object; and
   updating the machine learning algorithm based on the feedback.

3. The method of claim 1, wherein the training of the machine learning algorithm over the plurality of trials comprises refining numerical weights used by the machine learning algorithm to improve the correspondence between the objective outputs and the calculated output.

4. The method of claim 1, wherein the machine learning algorithm is operable to predict, in real time, upon completion of the new scan of the new object and prior to the post-processing of the new scan data produced by the new scan, whether the new scan data can return the accurate scanned reproduction of the new object.

5. A computing device, comprising:
   one or more scanners comprising one or more image sensors operable to produce scan data from scans of an object in a plurality of trials; and
   a processor operable to:
      receive the scan data from the one or more image sensors;
      post-process the scan data to generate a scanned reproduction of the object based on the scan data;
      determine, using the scanned reproduction of the object, objective outputs in the plurality of trials as to whether the post-processing of the scan data can return an accurate scanned reproduction of the object in the plurality of trials;
      train a machine learning algorithm over the plurality of trials to improve a correspondence between the objective outputs and a calculated output of the machine learning algorithm for the scan data, the machine learning algorithm operable to predict, upon completion of a new scan of a new object and prior to post-processing new scan data produced by the new scan, whether the new scan data can return an accurate scanned reproduction of the new object;

apply the machine learning algorithm to the new scan of the new object to determine whether the new scan of the new object can return the accurate scanned reproduction of the new object; and suggest an alternative position for the new object based, at least in part, on scan environment attributes included in the new scan data, in response to determining, prior to the post-processing of the new scan data, that the new scan is unlikely to return the accurate scanned reproduction of the new object.

6. The computing device of claim 5, wherein the machine learning algorithm is operable to predict, in real time, upon completion of the new scan of the new object and prior to the post-processing of the new scan data produced by the new scan, whether the new scan data can return the accurate scanned reproduction of the new object.

7. The computing device of claim 5, wherein the processor is further operable to notify a user that the new scan is unlikely to return the accurate scanned reproduction of the new object, in response to determining, prior to the post-processing of the new scan data, that the new scan is unlikely to return the accurate scanned reproduction of the new object.

8. The computing device of claim 5, wherein the processor is further operable to perform the post-processing of the scan data in each trial of the plurality of trials, to reach a number of objective outputs, one respective objective output in each trial, as to whether the post-processing of the scan data received for each trial can return a respective accurate reproduction of the object.

9. The computing device of claim 5, wherein the processor is further operable to suggest the alternative position for the new object by:

defining a volume where the new scan takes place; and
synthetically re-injecting the volume onto another surface.

10. The computing device of claim 5, wherein the machine learning algorithm comprises an artificial neural network including numeric weights.

11. The computing device of claim 10, wherein the training of the machine learning algorithm over the plurality of trials comprises refining the numerical weights to improve the correspondence between the objective outputs and the calculated output.

12. The computing device of claim 5, wherein the processor is further operable to:

receive feedback on an output of the applying of the machine learning algorithm to the new scan of the new object, and
update the machine learning algorithm based on the feedback.

13. The computing device of claim 5, wherein the computing device is used in association with a head mounted display device providing an augmented reality experience comprising the scanned reproduction of the new object.

14. A computer readable medium for storing computer instructions executed by one or more processors to perform the steps of:

receiving scan data from scans of an object in a plurality of trials;
post-processing the scan data to generate a scanned reproduction of the object based on the scan data;
determining, using the scanned reproduction of the object, objective outputs in the plurality of trials as to whether the post-processing of the scan data can return an accurate scanned reproduction of the object in the plurality of trials;
training a machine learning algorithm over the plurality of trials to improve a correspondence between the objective outputs and a calculated output of the machine learning algorithm for the scan data, the machine learning algorithm operable to predict, upon completion of a new scan of a new object and prior to post-processing new scan data produced by the new scan, whether the new scan data can return an accurate scanned reproduction of the new object;
applying the machine learning algorithm to the new scan of the new object to determine whether the new scan of the new object can return the accurate scanned reproduction of the new object, and
suggesting an alternative position for the new object based, at least in part, on scan environment attributes included in the new scan data, in response to determining, prior to the post-processing of the new scan data, that the new scan is unlikely to return the accurate scanned reproduction of the new object.

15. The computer readable medium of claim 14, wherein the new scan data comprises one or more data streams received from one or more image sensors of a head mounted display.

16. The computer readable medium of claim 15, wherein the one or more data streams include one or more of depth data, RGB data, infrared data, or pose data.

17. The computer readable medium of claim 14, wherein the instructions when executed by the one or more processors cause the one or more processors to perform further steps of:

receiving feedback on an output of the applying of the machine learning algorithm to the new scan of the new object; and
updating the machine learning algorithm based on the feedback.

18. The computer readable medium of claim 14, wherein the instructions when executed by the one or more processors cause the one or more processors to perform further steps of:

receiving an indication to abort the post processing of the new scan data, in response to applying the machine learning algorithm to the new scan of the new object to determine that the new scan of the new object cannot return the accurate scanned reproduction of the new object.

* * * * *